United States Patent Office 2,985,682
Patented May 23, 1961

2,985,682

METHOD OF MAKING CYANOACETIC ACID ESTERS

Harold Raffelson, Olivette, Mo., assignor to Monsanto Chemical Company, St. Louis, Mo., a corporation of Delaware No Drawing. Filed Dec. 31, 1958, Ser. No. 784,100

8 Claims. (Cl. 260—464)

This invention relates to a new and improved method of preparing certain cyanoacetic acid esters.

The cyanoacetic acid esters constitute a class of compounds which find wide application as intermediates in the preparation of important chemicals. By way of example, butyl cyanoacetate is useful in the preparation of caffeine.

It is known in the art that butyl cyanoacetate can be prepared by reacting potassium cyanide with butyl chloroacetate.[1] However, the process is unsatisfactory since the yield of butyl cyanoacetate is low because of a side reaction forming butyl cyanosuccinate,

It is therefore a primary object of this invention to provide a new process for preparing certain cyanoacetic acid esters in which their yields are greatly improved.

A further object is to provide a new process for preparing certain cyanoacetic acid esters without undesirable side reactions.

A still further object is to provide a more straightforward method of preparing cyanoacetic acid esters.

Other and further objects will be apparent to those skilled in the art.

The general reaction for preparing the cyanoacetic acid esters by the new process of this invention may be represented by the following equation:

$$XCH_2COOR + HCN + NH_3 \rightarrow NCCH_2COOR + NH_4X$$

where X is a halogen selected from the group consisting of chlorine, bromine and iodine and R is a member selected from the group consisting of (a) alkyl radicals having from 1 to 8 carbon atoms and the substituted alkoxy, phenyl, nitro, cyano and amino derivatives thereof; (b) cyclopentyl radicals and their substituted alkoxy, nitro, cyano, amino, and alkyl derivatives; (c) phenyl radicals and their substituted alkoxy, nitro, cyano, amino, alkyl and halo derivatives; (d) cyclohexyl radicals and their substituted alkoxy, nitro, cyano and amino derivatives; and (e) cyclobutyl radicals and their substituted alkoxy, nitro, cyano and amino derivatives.

The principal reactants consisting of the halo acetate ester, hydrogen cyanide, and ammonia are combined in a solvent medium such as dimethylformamide.

However, various modifications can be made in this process including the use of other solvents besides dimethylformamide such as methanol, tetrahydrofuran, dioxane, and the like. In general those solvents for the hydrogen cyanide and ammonia will be found suitable which remain liquid at the temperature at which the reaction is carried out which is usually between −10° C. to 25° C. but preferably near 0° C. It is to be noted that where the reaction is carried out at 0° C. or below certain solvents, such as dioxane, having melting points above 0° C. can not be used. The lower temperatures are preferred due to the instability of the ammonium cyanide which is formed from the reaction of the hydrogen cyanide and ammonia.

In order that those skilled in the art may better understand how the present invention may be carried into effect, the following examples are given as illustrative of preferred embodiments of the improved method of this invention.

EXAMPLE I

Butyl cyanoacetate

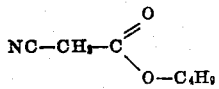

81.4 g. of butyl chloroacetate (0.54 mole) is dissolved in 25 ml. of dimethylformamide and 19.4 g. (0.72 mole) of liquid hydrogen cyanide is added at 0° C. At this temperature ammonia gas is passed into the solution for at least 7 hours or until 8.8 g. (0.52 mole) is added. The reaction mixture is then treated with ether and the insoluble salts filtered off. The ether and dimethylformamide are then distilled from the filtrate and the residue is washed with water and distilled under reduced pressure. Butyl cyanoacetate (37.9 g.) boiling at 125–129° C. at 25 mm. is collected: The yield, based on recovered butyl chloroacetate, is 89% of theory.

EXAMPLE II

Methyl cyanoacetate

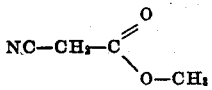

20 g. of liquid hydrogen cyanide (0.74 mole) is added to a solution of 60.8 g. (0.56 mole) of methyl chloroacetate in 50 ml. of dioxane at 12° C. Ammonia is then passed into the solution, while maintaining the temperature at 12° C., until 9.2 g. (0.54 mole) is added in at least 7 hours. Ether is then added, the mixture filtered and the solvents removed under reduced pressure. The methyl cyanoacetate is obtained in good yield by distillation therefrom.

EXAMPLE III

Octyl cyanoacetate

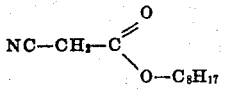

A solution of 37.5 g. (0.15 mole) of octyl bromoacetate in methanol is cooled to 0° C. and 5.4 g. (0.2 mole) of liquid hydrogen cyanide is added. 2.55 g. of ammonia (0.15 mole) is introduced below the surface of the solution over a period of 6 to 7 hours. The salts are precipitated by the addition of ether and are filtered. The solvents are removed by distillation and the resulting product is further distilled to obtain octyl cyanoacetate in good yield.

EXAMPLE IV

Hexyl cyanoacetate

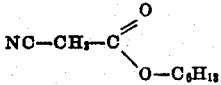

Ammonia gas is passed into a solution of 27 g. (0.1 mole) of n-hexyl iodoacetate and 3.6 g. (0.133 mole) of liquid hydrogen cyanide in tetrahydrofuran at 0° C. When 1.7 g. (0.10 mole) of ammonia has been added over a period of 6 to 7 hours, ether is added, and the salts filtered from the solution. The solvent is then removed by distillation and the resulting product distilled. There is obtained hexyl cyanoacetate in good yield.

[1] JACS, vol. 26, 1545 (1904).

EXAMPLE V

3-phenyl-4-methylpentyl cyanoacetate

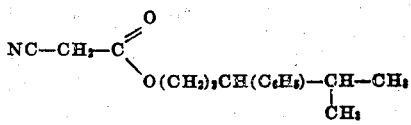

A solution of 50.8 g. (0.2 mole) of 3-phenyl-4-methylpentyl chloroacetate in methanol is cooled to 0° C. and 6.8 g. (0.25 mole) of liquid hydrogen cyanide is added. 3.4 g. of ammonia (0.2 mole) is introduced below the surface of the solution over a period of 6 to 7 hours. After removal of the salts and solvent, 3-phenyl-4-methylpentyl cyanoacetate is obtained in good yield.

EXAMPLE VI

Cyclobutyl cyanoacetate

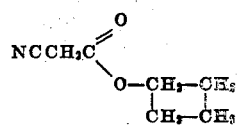

Ammonia gas is passed into a solution of 75 g. (0.5 mole) of cyclobutyl chloroacetate and (0.67 mole) 18 g. of liquid hydrogen cyanide in tetrahydrofuran at 0° C. When 8.8 g. (0.52 mole) of ammonia has been added over a period of 6 to 7 hours, the reaction is terminated and cyclobutyl chloroacetate is isolated in good yield.

EXAMPLE VII

2-methoxy-n-butyl cyanoacetate

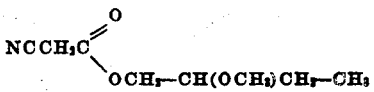

90.0 g. of 2-methoxy-n-butyl chloroacetate (0.5 mole) is dissolved in 30 ml. of dimethylformamide and 16 g. (0.6 mole) of liquid hydrogen cyanide is added at 0° C. Ammonia gas is then passed into the solution for at least 7 hours or until 9 g. (0.53 mole) is added. 2-methoxy-n-butyl cyanoacetate is isolated from the reaction mixture in good yield.

EXAMPLE VIII

4-propoxy-n-octyl cyanoacetate

6.8 g. of liquid hydrogen cyanide (0.25 mole) is added to a solution of 61 g. (0.2 mole) of 4-propoxy-n-octyl bromoacetate in 60 ml. of dioxane at 12° C. Ammonia is then passed into the solution while maintaining the temperature at 12° C. until 3.4 g. (0.2 mole) is added in at least 6 hours. 4-propoxy-n-octyl cyanoacetate is obtained from the reaction mixture in good yield.

EXAMPLE IX

Cyclohexyl cyanoacetate

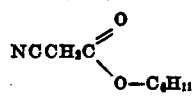

44.2 g. of cyclohexyl bromoacetate (0.2 mole) is dissolved in 30 ml. of dimethyl formamide and 6.7 g. (0.25 mole) of liquid hydrogen cyanide is added at 0° C. at this temperature. Ammonia gas is passed into the solution for at least 7 hours or until 3.7 g. (0.22 mole) is added. Cyclohexyl cyanoacetate is obtained in good yield.

It will be noted from the above description and examples that the new process of this invention is of a general nature and comprises the reaction of a haloacetate ester with hydrogen cyanide and ammonia in the presence of an appropriate solvent. Haloacetate esters contemplates by this invention as reactants include:

4-phenylbutyl chloroacetate
o-Butoxyphenyl chloroacetate
Benzyl bromoacetate
3-propoxy-n-hexyl iodoacetate
2-aminocyclopentyl iodoacetate
5-aminoheptyl bromoacetate
8-nitrooctyl chloroacetate
8-phenyloctyl bromoacetate
2-aminocyclobutyl bromoacetate
4-bromophenyl chloroacetate
Nitrophenyl bromoacetate
3-cyanohexyl iodoacetate
Methyl chloroacetate
2-ethoxy-n-pentyl bromoacetate
Tolyl chloroacetate
2-aminooctyl chloroacetate
Butyl bromoacetate
7-cyanoheptyl bromoacetate
Benzyl iodoacetate
6-phenylhexyl chloroacetate
Hexyl iodoacetate
3-propoxycyclopentyl bromoacetate
Xylyl chloroacetate
2-nitrocyclobutyl iodoacetate
Octyl chloroacetate
2-propoxyphenyl chloroacetate
Chlorophenyl chloroacetate
3,5-dinitrocyclohexyl bromoacetate
Ethyl iodoacetate
2,3-dimethylphenyl iodoacetate
2,5-dibromophenyl chloroacetate
4-cyanocyclohexyl chloroacetate
Heptyl bromoacetate
2,4-diaminophenyl bromoacetate
o-Ethylphenyl chloroacetate
5-cyanooctyl chloroacetate
Amyl chloroacetate
2-butoxycyclopentyl iodoacetate
p-Butylphenyl bromoacetate
2-butylphenyl chloroacetate
Propyl bromoacetate
4-nitrocyclohexyl bromoacetate
2-nitrobutyl bromoacetate
2-chloro-4-bromophenyl chloroacetate
p-Butylphenyl chloroacetate
3-aminophenyl iodoacetate
m-Propoxyphenyl bromoacetate
5-methoxycyclopentyl chloroacetate
3-nitrocyclohexyl bromoacetate
3-cyanocyclobutyl chloroacetate
p-Methoxyphenyl chloroacetate
2,4-diiodophenyl chloroacetate
4-phenylcyclohexyl bromoacetate
2-hexylcyclopentyl bromoacetate
2-nitroamyl chloroacetate
3-methoxypropyl iodoacetate
2-cyanobutyl bromoacetate
2,5-dibromophenyl chloroacetate
3-aminohexyl chloroacetate
6-aminohexyl bromoacetate
p-Aminophenyl bromoacetate, and the like The importance of the method of this invention from a commercial standpoint is illustrated by the fact that ordinarily an alkyl cyanoacetate such as butyl cyanoacetate is prepared in four steps starting with chloroacetic acid as follows:

(1) 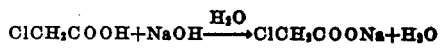

(2) $ClCH_2COONa + NaCN \rightarrow CN-CH_2COONa + NaCl$ (3) 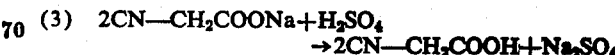

(4) 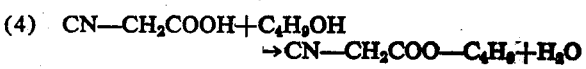

However, if the method of this invention is employed, butyl cyanoacetate may be prepared by the following two steps, starting with chloroacetic acid:

(1) $ClCH_2COOH + C_4H_9OH \rightarrow ClCH_2COOC_4H_9 + H_2O$ (2) $ClCH_2COOC_4H_9 + HCN + NH_3$
$\rightarrow CNCH_2COOC_4H_9 + NH_4Cl$ While there have been described what is at present considered to be the preferred embodiments of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. A method of preparing cyanoacetic acid esters of the general structure $$NCCH_2C\begin{matrix}\nearrow O \\ \searrow O-R\end{matrix}$$

where R is a member of the group consisting of (a) alkyl radicals having from 1 to 8 carbon atoms and their mono and disubstituted alkoxy, phenyl, nitro, cyano, and amino derivatives; (b) phenyl and its mono and disubstituted alkoxy, nitro, cyano, amino, alkyl and halo derivatives; and (c) cycloalkyl radicals having from 4 to 6 carbon atoms and their mono and disubstituted alkoxy, nitro, cyano, alkyl and amino derivatives; which comprises reacting hydrogen cyanide and ammonia with a haloacetate ester of the structure $XCH_2COOR$ where X is a member of the group consisting of chlorine, bromine and iodine, and R has the same meaning as above, the reaction taking place in the presence of an inert solvent and at a temperature up to about 25° C.

2. The method of claim 1 wherein the reaction takes place over a temperature range of from about −10° C. to about 25° C.

3. The method of claim 1 wherein the inert solvent is dimethyl formamide.

4. The method of preparing butyl cyanoacetate which comprises reacting hydrogen cyanide and ammonia with butyl chloroacetate, the reaction taking place in the presence of an inert solvent and at a temperature up to about 25° C.

5. The method of preparing phenyl cyanoacetate which comprises reacting hydrogen cyanide and ammonia with phenyl chloroacetate, the reaction taking place in the presence of an inert solvent and at a temperature up to about 25° C.

6. The method of preparing 4-propoxy-n-octyl cyanoacetate which comprises reacting hydrogen cyanide and ammonia with 4-propoxy-n-octyl chloroacetate, the reaction taking place in the presence of an inert solvent and at a temperature up to about 25° C.

7. The method of preparing benzyl cyanoacetate which comprises reacting hydrogen cyanide and ammonia with benzyl chloroacetate, the reaction taking place in the presence of an inert solvent and at a temperature up to about 25° C.

8. The method of preparing cyclohexyl cyanoacetate which comprises reacting hydrogen cyanide and ammonia with cyclohexyl chloroacetate, the reaction taking place in the presence of an inert solvent and at a temperature up to about 25° C.

No references cited.